(12) United States Patent
Zhai et al.

(10) Patent No.: US 12,270,672 B2
(45) Date of Patent: Apr. 8, 2025

(54) METHOD FOR GENERATING NAVIGATION INFORMATION, APPARATUS FOR GENERATING NAVIGATION INFORMATION, DEVICE, MEDIUM, AND PRODUCT

(71) Applicant: Beijing Baidu Netcom Science Technology Co., Ltd., Beijing (CN)

(72) Inventors: Tingting Zhai, Beijing (CN); Peng Yang, Beijing (CN); Hongfei Zhu, Beijing (CN)

(73) Assignee: BEIJING BAIDU NETCOM SCIENCE TECHNOLOGY CO, LTD., Beijing (CN)

( * ) Notice: Subject to any disclaimer, the term of this patent is extended or adjusted under 35 U.S.C. 154(b) by 85 days.

(21) Appl. No.: 17/712,557

(22) Filed: Apr. 4, 2022

(65) Prior Publication Data
US 2022/0228880 A1 Jul. 21, 2022

(30) Foreign Application Priority Data
Sep. 30, 2021 (CN) .......................... 202111156194.0

(51) Int. Cl.
*G01C 21/36* (2006.01)
(52) U.S. Cl.
CPC ................ *G01C 21/3629* (2013.01)
(58) Field of Classification Search
None
See application file for complete search history.

(56) References Cited

U.S. PATENT DOCUMENTS

| 6,621,494 B2 * | 9/2003 | Matsuoka | G09B 29/106 |
| | | | 701/533 |
| 8,935,046 B2 * | 1/2015 | Muhlfelder | G08G 1/096861 |
| | | | 701/428 |
| 9,052,503 B2 * | 6/2015 | Gassner | G01C 21/3632 |
| 11,447,240 B2 * | 9/2022 | Huot | B64C 27/82 |
| 11,887,473 B2 * | 1/2024 | Tan | G08G 1/0129 |

(Continued)

FOREIGN PATENT DOCUMENTS

| CN | 1493851 A * | 5/2004 |
| CN | 101169330 A | 4/2008 |

(Continued)

*Primary Examiner* — Redhwan K Mawari
*Assistant Examiner* — Kai Wang
(74) *Attorney, Agent, or Firm* — Ice Miller LLP; Justin Swindells

(57) ABSTRACT

The present disclosure provides a method for generating navigation information, an apparatus for generating navigation information, a device, a medium, and a product. The present disclosure relates to the technical field of computers, and specifically relates to the technical field of artificial intelligence, and the present disclosure may be applied to a map navigation scenario. A specific implementation includes: acquiring intersection feature information; determining a set of a complex intersection based on the intersection feature information; determining intersection type information corresponding to the complex intersection in the set of the complex intersection; and generating navigation information corresponding to the complex intersection in the set of the complex intersection based on the intersection type information.

12 Claims, 5 Drawing Sheets

(56) References Cited

U.S. PATENT DOCUMENTS

| | | |
|---|---|---|
| 2007/0055444 A1 | 3/2007 | Mikame |
| 2008/0208450 A1 | 8/2008 | Katzer |
| 2008/0208460 A1 | 8/2008 | Nakao et al. |
| 2010/0256899 A1 | 10/2010 | Katzer |
| 2020/0025584 A1 | 1/2020 | Fowe |
| 2021/0312195 A1* | 10/2021 | He .................. G06F 18/214 |
| 2021/0381846 A1 | 12/2021 | Pingnan et al. |
| 2022/0128372 A1* | 4/2022 | Lin .................. G01C 21/3461 |
| 2022/0129731 A1* | 4/2022 | Guo .................. G06N 3/08 |
| 2022/0204000 A1* | 6/2022 | Chen .................. B60W 60/005 |
| 2022/0237529 A1* | 7/2022 | Zhang .................. G08G 1/0129 |
| 2022/0244060 A1* | 8/2022 | Li .................. G08G 1/096844 |
| 2022/0254253 A1* | 8/2022 | Dai .................. G08G 1/0125 |
| 2022/0309702 A1* | 9/2022 | Deng .................. G06F 3/013 |

FOREIGN PATENT DOCUMENTS

| | | | |
|---|---|---|---|
| CN | 104977016 A | 10/2015 | |
| CN | 111862586 A | 10/2020 | |
| CN | 112102489 A * | 12/2020 | ............ G06F 16/29 |
| CN | 112710321 A * | 4/2021 | |
| CN | 112710325 A | 4/2021 | |
| CN | 112798003 A | 5/2021 | |
| CN | 113160693 A | 7/2021 | |
| CN | 113297878 A | 8/2021 | |
| EP | 0703434 A2 | 3/1996 | |
| FR | 3106922 A1 | 8/2021 | |

\* cited by examiner

METHOD FOR GENERATING NAVIGATION INFORMATION, APPARATUS FOR GENERATING NAVIGATION INFORMATION, DEVICE, MEDIUM, AND PRODUCT

CROSS-REFERENCE TO RELATED APPLICATIONS

The present application claims the priority of Chinese Patent Application No. 202111156194.0, titled "METHOD FOR GENERATING NAVIGATION INFORMATION, APPARATUS FOR GENERATING NAVIGATION INFORMATION, DEVICE, MEDIUM, AND PRODUCT", filed on Sep. 30, 2021, the content of which is incorporated herein by reference in its entirety.

TECHNICAL FIELD

The present disclosure relates to the technical field of computers, and specifically relates to the technical field of artificial intelligence, and the present disclosure may be applied to a map navigation scenario.

BACKGROUND

At present, in the process of navigation, navigation information in the form of, e.g., voices or images is often used to guide users to destinations.

In practice, it is found that for different complex intersections, abstract results of these different complex intersections are similar in maps, thereby resulting in the output of similar navigation information for the different complex intersections. Hence, the existing approaches of generating navigation information have the problem of poor discrimination degree for complex intersections.

SUMMARY

The present disclosure provides a method for generating navigation information, an apparatus for generating navigation information, a device, a medium, and a product.

According to an aspect of the present disclosure, a method for generating navigation information is provided, including: acquiring intersection feature information; determining a set of a complex intersection based on the intersection feature information; determining intersection type information corresponding to the complex intersection in the set of the complex intersection; and generating navigation information corresponding to the complex intersection in the set of the complex intersection based on the intersection type information.

According to another aspect of the present disclosure, an electronic device is provided, including: at least one processor; and a memory communicatively connected to the at least one processor; where the memory stores instructions executable by the at least one processor, and the instructions, when executed by the at least one processor, cause the at least one processor to execute the method as described in any implementation of the first aspect.

According to another aspect of the present disclosure, a non-transitory computer readable storage medium storing computer instructions is provided, where the computer instructions are used for causing a computer to execute the method for generating navigation information as described in any implementation of the first aspect.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose any limitation on the present disclosure. In the accompanying drawings.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various alterations and modifications may be made to the embodiments described here without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
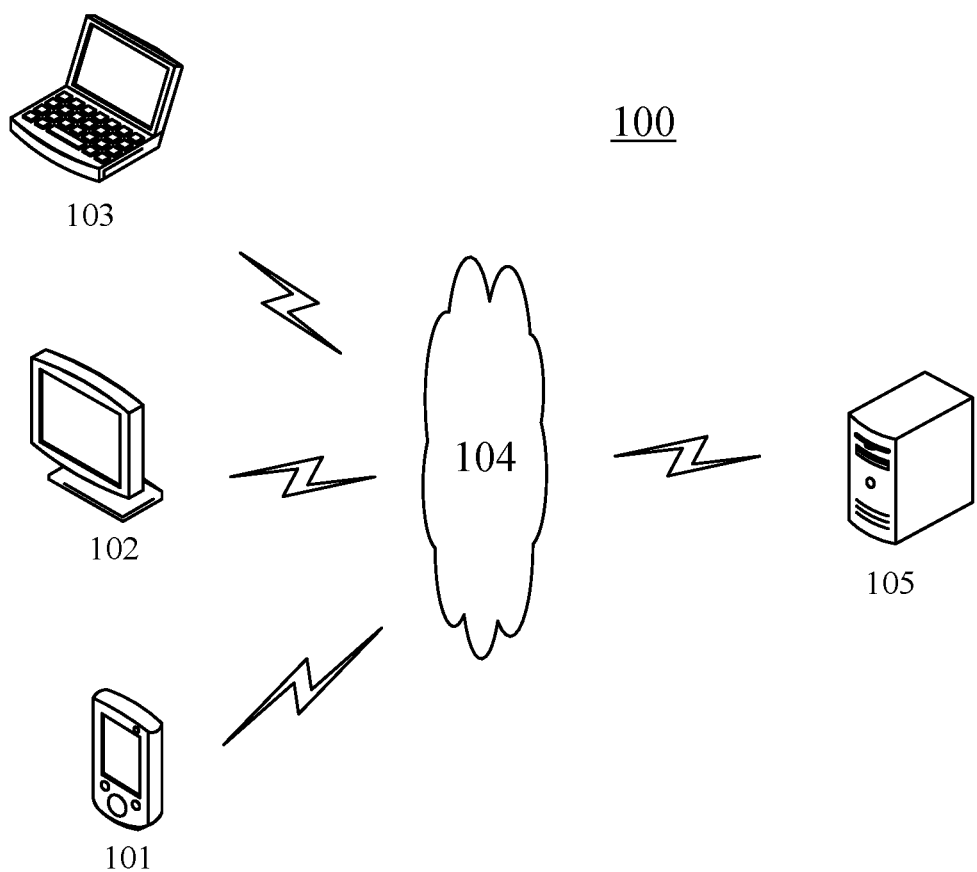
FIG. 1 is a diagram of an example system architecture in which an embodiment of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with application software for map navigation. The user can control the application software to output navigation information for vehicle navigation by executing corresponding touch operations in the application software. The navigation information in the application software may be preset with navigation broadcasting voices for targeted broadcasting for complex intersections. In order to set these navigation broadcasting voices for complex intersections, the terminal devices 101, 102, and 103 may acquire intersection feature information, and send such intersection feature information to the server 105 via the network 104, such that the server 105 processes the intersection feature information, and generates these navigation broadcasting voices.

The terminal devices 101, 102, and 103 may be hardware, or may be software. When the terminal devices 101, 102, and 103 are hardware, the terminal devices may be various electronic devices, including but not limited to a smart phone, an on-board computer, an on-board tablet, a vehicle control device, and the like. When the terminal devices 101, 102, and 103 are software, the terminal devices may be installed in the above-listed electronic devices, or may be implemented as a plurality of software programs or software modules (e.g., software programs or software modules for providing distributed services), or may be implemented as a single software program or software module. This is not specifically limited here.

The server 105 may be a server that provides various services. For example, the server 105 may acquire the intersection feature information sent from the terminal devices 101, 102, and 103, or the server 105 may acquire such intersection feature information from other devices that have established connections with the server. Then, the server 105 may determine a set of a complex intersection based on the intersection feature information, and generate corresponding navigation information based on intersection type information corresponding to the complex intersection in the set of the complex intersection. When the navigation information is returned to the terminal devices 101, 102, and 103, if the terminal devices 101, 102, and 103 are detected to travel through a complex intersection, the navigation information corresponding to the complex intersection is returned to the terminal devices 101, 102, and 103.

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for generating navigation information provided in embodiments of the present disclosure may be executed by the terminal devices 101, 102, and 103, or be executed by the server 105. The apparatus for generating navigation information may be provided in the terminal devices 101, 102, and 103, or be provided in the server 105.

It should be understood that the numbers of the terminal devices, the network, and the server in FIG. 1 are merely illustrative. Any number of terminal devices, networks, and servers may be provided based on actual requirements.

According to the technology of the present disclosure, the method for generating navigation information is provided, which can targetedly generate navigation information for complex intersections, thereby improving the discrimination degree of navigation for complex intersections.

Figure 2:
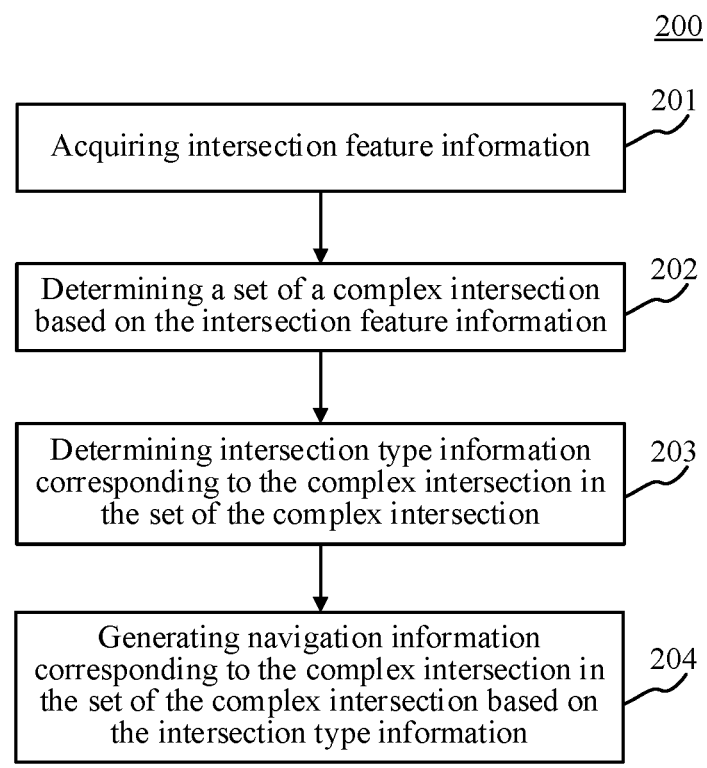
FIG. 2 is a flowchart of a method for generating navigation information according to an embodiment of the present disclosure.

Further referring to FIG. 2, a process 200 of a method for generating navigation information according to an embodiment of the present disclosure is shown. The method for generating navigation information of the present embodiment includes the following steps:

Step 201: acquiring intersection feature information.

In the present embodiment, an executing body (e.g., the terminal devices 101, 102, and 103 or the server 105 in FIG. 1) may acquire intersection feature information of an intersection from a local storage, or may acquire intersection feature information of an intersection from other devices that have pre-established a connection with the executing body. In the present embodiment, a storage path of the intersection feature information is not limited. The intersection feature information is used for describing the feature of the intersection, and may include, but is not limited to, a yaw rate feature of the intersection, a road feature of the intersection, a navigation setting feature of the intersection, and the like. This is not limited in the present embodiment. Specifically, the yaw rate feature of the intersection may be obtained by a monitoring device corresponding to the intersection by statisticizing the yaw of vehicles. The road feature of the intersection may include, but is not limited to, a road type, the number of roads, a road angle relationship, road capacity, and the like. The navigation setting feature of the intersection may be a preset identification feature for describing whether the intersection is provided with specific navigation information for a complex intersection.

Step 202: determining a set of a complex intersection based on the intersection feature information.

In the present embodiment, the executing body may determine, based on the intersection feature information of the intersection, a complex intersection from the intersection, to form the set of the complex intersection. The complex intersection in the set of the complex intersection may be an intersection with a yaw rate greater than a preset yaw rate threshold when a vehicle is traveling according to a general navigator.

In some alternative implementations of the present embodiment, the determining the set of the complex intersection based on the intersection feature information may include: determining, for each intersection, in response to determining that a navigation setting feature of an intersection indicates the intersection being already provided with an identification feature for describing specific navigation information for a complex intersection, and that a yaw rate feature of the intersection indicates a yaw rate of the intersection being greater than a preset yaw rate threshold, the intersection as a complex intersection. Based on intersections that are determined as complex intersections, a set of complex intersections is obtained. By implementing these alternative implementations, an intersection that is already provided with the specific navigation information for the complex intersection but still has a high yaw rate, may be still determined as a complex intersection, and intersection type information of the intersection may be re-determined, and then specific navigation information for a complex intersection may be re-generated, thereby achieving iterative calibration of the specific navigation information for the complex intersection, and improving the accuracy of the generated navigation information.

In some alternative implementations of the present embodiment, the determining the set of the complex intersection based on the intersection feature information may further include: determining a set of candidate complex intersections based on road feature information and navigation setting feature information of intersections, where the set of the candidate complex intersections includes an intersection whose navigation setting feature indicates the intersection being provided with the specific navigation information for the complex intersection, and includes an intersection whose road feature information indicates the road feature belonging to a complex category; determining, for each candidate complex intersection in the set of the candidate complex intersections, in response to determining that a yaw rate feature corresponding to a candidate complex intersection indicates the yaw rate being greater than a preset yaw rate threshold, the candidate complex intersection as a complex intersection; and determining a set of complex intersections based on complex intersections. By implementing these alternative implementations, candidate complex intersections may be determined based on road feature information and navigation setting feature information, and then a complex intersection may be determined based on a yaw rate. These implementations determine a complex intersection by combining road feature information, a navigation setting feature, and a yaw rate feature, thereby improving the accuracy of the complex intersection.

Step 203: determining intersection type information corresponding to the complex intersection in the set of the complex intersection.

In the present embodiment, intersection type information is used for describing a category to which each complex intersection in the set of the complex intersection belongs. Each complex intersection may have a corresponding intersection type information, or the intersection type information may include an intersection type corresponding to each complex intersection. For a category to which each complex intersection belongs, a category table may be preset. The executing body may match each complex intersection in the set of the complex intersection with a category in the category table, to determine intersection type information matching each complex intersection.

Step 204: generating navigation information corresponding to the complex intersection in the set of the complex intersection based on the intersection type information.

In the present embodiment, the navigation information may be information that is composed of a voice form, an image form, an animation form, and the like, and is used for guiding a vehicle to travel through a complex intersection. The executing body may pre-store a corresponding relationship between intersection types and navigation information, and may further determine, after determining an intersection type of each complex intersection, navigation information matching the intersection type of each complex intersection.

In some alternative implementations of the present embodiment, the generating the navigation information corresponding to the complex intersection in the set of the complex intersection based on the intersection type information may include: determining, for each complex intersection in the set of the complex intersection, an intersection type corresponding to a complex intersection based on intersection type information; determining navigation template information matching the intersection type, where the navigation template information includes at least one of a voice template or an image template; determining a voice parameter and an image parameter corresponding to the complex intersection based on the intersection feature information of the complex intersection; and rendering the navigation template information based on the voice parameter and the image parameter corresponding to the complex intersection, to obtain the navigation information corresponding to the complex intersection. By implementing these alternative implementations, when navigation information corresponding to a complex intersection is generated, navigation template information matching an intersection type of the complex intersection may be first determined, then a corresponding navigation parameter may be determined based on the intersection feature information of the complex intersection, and final navigation information may be obtained based on the navigation parameter and the navigation template information. The navigation information obtained by these implementations includes both common navigation template information and an individual navigation parameter corresponding to a complex intersection, and can further improve the accuracy of the navigation information.

Figure 3:
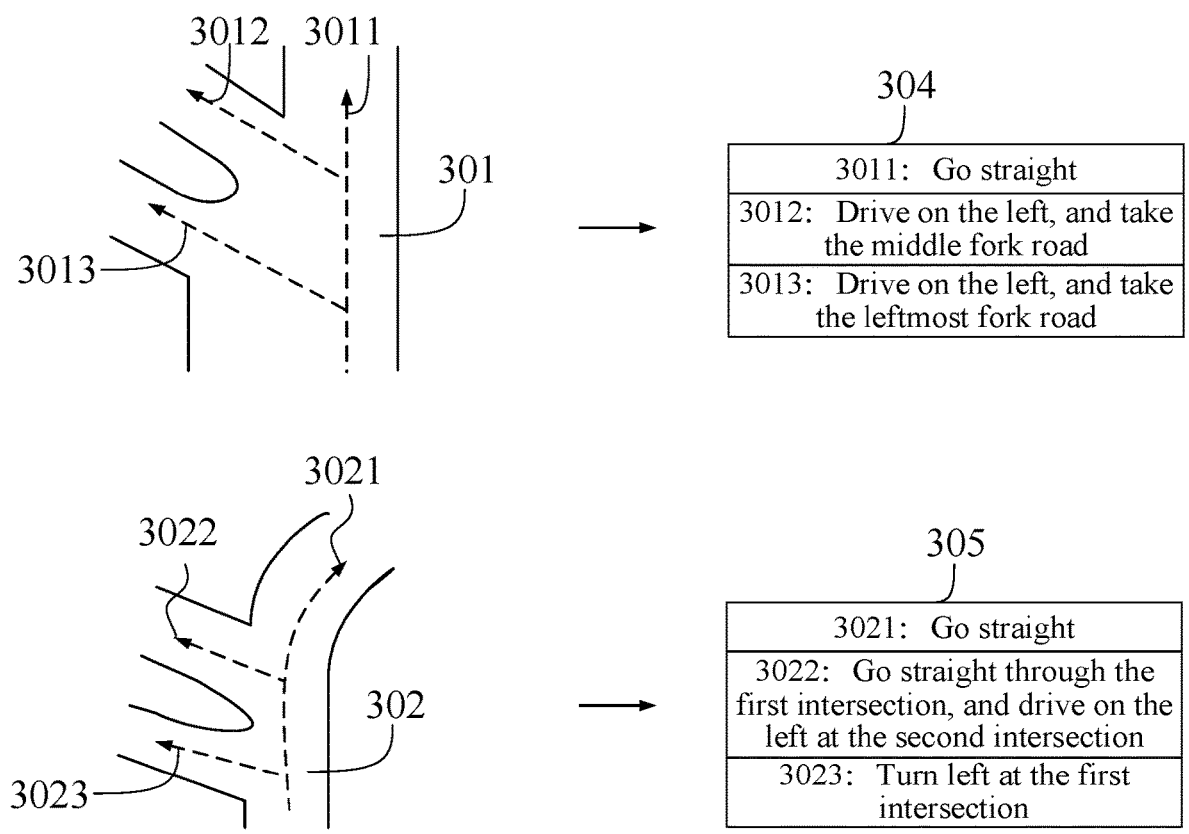
FIG. 3 is a schematic diagram of an application scenario of the method for generating navigation information according to an embodiment of the present disclosure.

Further referring to FIG. 3, a schematic diagram of an application scenario of the method for generating navigation information according to an embodiment of the present disclosure is shown. In the application scenario of FIG. 3, an executing body may determine a set of complex intersections based on intersection feature information of intersections, where the set of the complex intersections at least includes two different complex intersections, namely a complex intersection 301 and a complex intersection 302. The complex intersection 301 has three fork roads, namely a road 3011, a road 3012, and a road 3013. The complex intersection 302 has three fork roads, namely a road 3021, a road 3022, and a road 3023. In an existing technology, if the complex intersection 301 and the complex intersection 302 are not distinguished from each other, uniform navigation information is outputted for these intersections with three fork roads. For example, "drive on the left, and take the middle fork road" is outputted for both the road 3012 and the road 3022. In this case, for the complex intersection 302, it is difficult to perceive the road 3022 in the vision field of a user, such that it will be difficult for the user to drive correctly based on the navigation information, and yaw easily occurs.

In the present embodiment, the executing body may generate targeted navigation information for each complex intersection in the set of the complex intersections, thereby reducing the driving yaw rate. Specifically, the executing body may first determine an intersection category corresponding to the complex intersection 301, for example, the intersection category may be an intersection of visible three fork roads. Then, the executing body further determines a navigation broadcasting voice corresponding to the intersection of the visible three fork roads, to obtain a navigation broadcasting voice corresponding to the complex intersection 301. That is, for the road 3011, a navigation broadcasting voice of "go straight" is generated; for the road 3012, a navigation broadcasting voice of "drive on the left, and take the middle fork road" is generated; and for the road 3013, a navigation broadcasting voice of "drive on the left, and take the leftmost fork road" is generated. For the complex intersection 302, the executing body may determine an intersection category corresponding to the complex intersection 302, for example, the intersection category may be an intersection of three fork roads with a weakly perceived middle road. Then, the executing body may further determine a navigation broadcasting voice corresponding to the intersection of the three fork roads with the weakly perceived middle road, to obtain a navigation broadcasting voice corresponding to the complex intersection 302. That is, for the road 3021, a navigation broadcasting voice of "go straight" is generated; for the road 3022, a navigation broadcasting voice of "go straight through the first intersection, and drive on the left at the second intersection" is generated; and for the road 30'23, a navigation broadcasting voice of "turn left at the first intersection" is generated.

The method for generating navigation information provided in the above embodiments of the present disclosure can targetedly generate navigation information for complex intersections, thereby improving the discrimination degree of navigation for the complex intersections.

Figure 4:
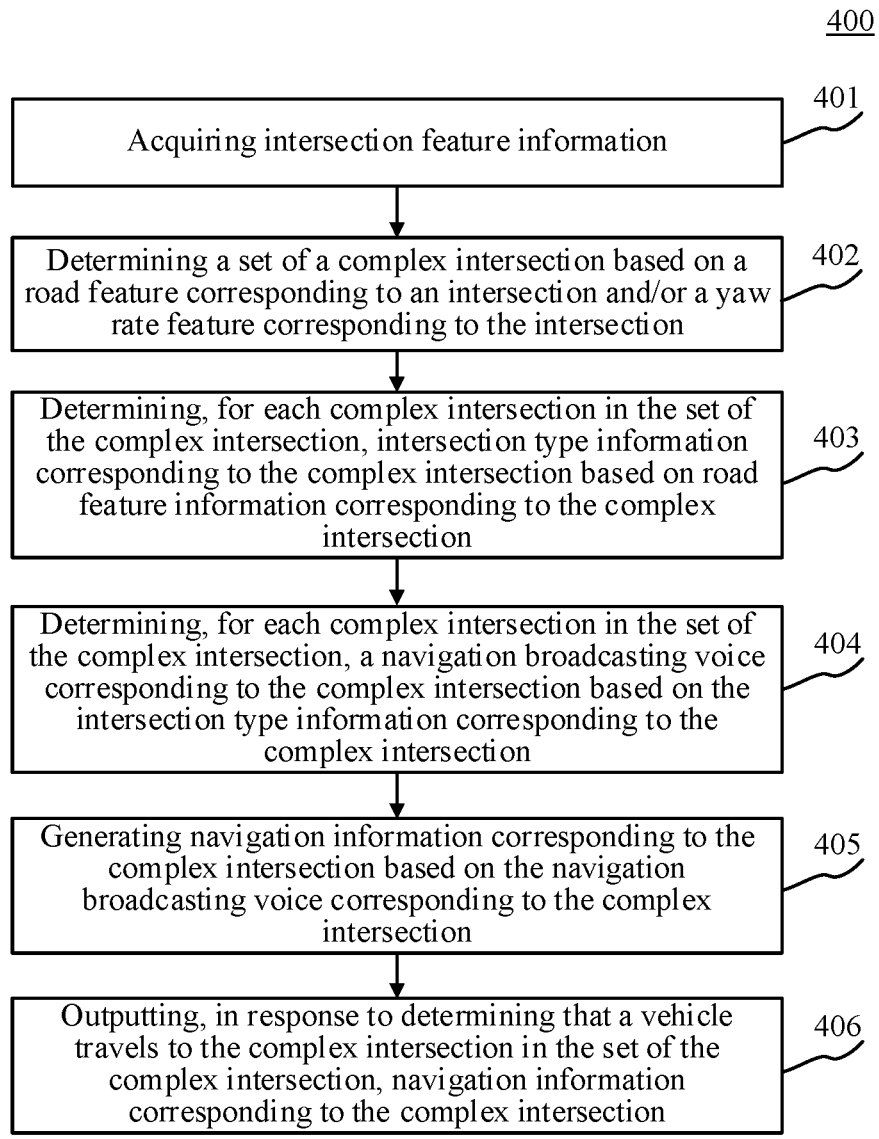
FIG. 4 is a flowchart of the method for generating navigation information according to another embodiment of the present disclosure.

Further referring to FIG. 4, a process 400 of the method for generating navigation information according to another embodiment of the present disclosure is shown. As shown in FIG. 4, the method for generating navigation information of the present embodiment may include the following steps:

Step 401: acquiring intersection feature information.

In the present embodiment, the intersection feature information at least includes a road feature corresponding to an intersection and/or a yaw rate feature corresponding to the intersection. The road feature corresponding to the intersection may include, but is not limited to, the number of roads, a road function, road capacity, a road angle relationship, and the like. This is not limited in the present embodiment. The number of roads refers to the number of fork roads at the intersection, the road function refers to whether the fork roads belong to a main road or an auxiliary road, and the road angle relationship refers to information of angles between the fork roads. The yaw rate feature corresponding to the intersection may be a proportion of yawed vehicles traveling through the intersection within a specified time interval. The detailed description of step 201 may be referred to for the detailed description of step 401. The description will not be repeated here.

Step 402: determining a set of a complex intersection based on a road feature corresponding to an intersection and/or a yaw rate feature corresponding to the intersection.

In the present embodiment, the executing body may determine a complex intersection based on the road feature corresponding to the intersection; or may determine a complex intersection based on the yaw rate feature corresponding to the intersection; or may determine a complex intersection based on the road feature corresponding to the intersection and the yaw rate feature corresponding to the intersection. This is not limited in the present embodiment. When a complex intersection is determined based on the road feature corresponding to the intersection, a set of complex intersection samples may be pre-determined manually, and by clustering a road feature of each complex intersection sample in the set of the complex intersection samples, a road feature content corresponding to a complex intersection is obtained. Then, the executing body may compare a road feature corresponding to each intersection with the road feature content corresponding to the complex intersection, to determine whether an intersection is a complex intersection. Alternatively, when the set of the complex intersection is determined based on a yaw rate feature corresponding to an intersection, some embodiments of the present disclosure may preset monitoring points of intersections, may determine whether a yaw rate of each intersection reaches a threshold based on monitoring information collected by the monitoring points, and may determine an intersection as a complex intersection when a yaw rate of the intersection reaches the threshold.

In some alternative implementations of the present embodiment, the road feature corresponding to the intersection at least includes the number of roads; the determining the set of the complex intersection based on the road feature corresponding to the intersection and/or the yaw rate feature corresponding to the intersection includes: determining, for each intersection, in response to determining that the number of roads corresponding to the intersection is greater than a preset number threshold and/or a yaw rate feature corresponding to the intersection indicates a yaw rate being greater than a preset yaw rate threshold, the intersection as a complex intersection; and determining the set of the complex intersection based on the complex intersection.

In the preset implementation, the executing body may preset the number threshold corresponding to the number of roads, for example, may preset the number threshold as 3. In this case, the executing body may determine an intersection with the number of roads greater than 3 as a complex intersection. When determining the set of the complex intersection based on the road feature corresponding to the intersection and the yaw rate feature corresponding to the intersection, the executing body may determine an intersection with the number of roads greater than the number threshold and with the yaw rate greater than the preset yaw rate threshold as a complex intersection.

Step 403: determining, for each complex intersection in the set of the complex intersection, intersection type information corresponding to a complex intersection based on road feature information corresponding to the complex intersection.

In the present embodiment, the road feature information is used for describing a feature of each road corresponding to the complex intersection, and may include, but is not limited to, user perception of each road, angle relationship between the roads, function of each road, and the like. This is not limited in the present embodiment. The user perception of each road is used for describing whether a user easily perceives the road during driving, the angle relationship between the roads is used for describing angles between the roads, and the function of each road is used for describing whether a road is a main road or an auxiliary road.

The executing body may pre-store a corresponding relationship between road feature information and intersection type information. For example, the executing body may preset a visible type corresponding to a perceivable road, a weakly visible type corresponding to a hardly perceivable road, and the like.

Step 404: determining, for each complex intersection in the set of the complex intersection, a navigation broadcasting voice corresponding to a complex intersection based on the intersection type information corresponding to the complex intersection.

In the present embodiment, the navigation information at least includes a navigation broadcasting voice. The navigation broadcasting voice is used for outputting, when a vehicle travels to a complex intersection, a voice prompt for guiding the user to drive the vehicle through the complex intersection.

The executing body may pre-store a corresponding relationship between intersection type information and navigation broadcasting voices. Alternatively, the executing body may pre-store a corresponding relationship between intersection type information and navigation broadcasting voice templates, and then generate a final navigation broadcasting voice based on a navigation broadcasting voice template and the road feature information of the complex intersection. The detailed description of generating the navigation information in step 204 may be referred to for the detailed description of generating the navigation broadcasting voice. The description will not be repeated here.

Step 405: generating navigation information corresponding to the complex intersection based on the navigation broadcasting voice corresponding to the complex intersection.

In the present embodiment, the navigation information may include not only the navigation broadcasting voice, but also information, such as a navigation broadcasting animation and a navigation broadcasting image. For different complex intersections, corresponding navigation broadcasting animations and navigation broadcasting images may be further provided to guide the user to drive based on richer navigation information, and may achieve better navigation effects.

Step 406: outputting, in response to determining that a vehicle travels to a complex intersection in the set of the complex intersection, navigation information corresponding to the complex intersection.

In the present embodiment, if the vehicle travels to an intersection provided with specific navigation information for a complex intersection, navigation information corresponding to the complex intersection is outputted. For example, the information, such as the navigation broadcasting voice, the navigation broadcasting animation, and the navigation broadcasting image, is outputted.

According to the method for generating navigation information provided in the above embodiments of the present disclosure, a set of a complex intersection may be determined based on a road feature of an intersection and a yaw rate feature corresponding to the intersection, thereby improving the accuracy of the determination of a complex intersection. Intersection type information of the complex intersection may be determined based on analysis of road feature information of the complex intersection, such that the type information can reflect the road feature of the intersection, and the type division is more accurate. The navigation information may be in various forms, such as a navigation broadcasting voice and a navigation broadcasting animation, thereby improving the diversity of forms of the navigation information. Specific navigation information for a complex intersection may be outputted when a vehicle travels to the complex intersection, thereby improving the discrimination degree of navigation for complex intersections.

Figure 5:
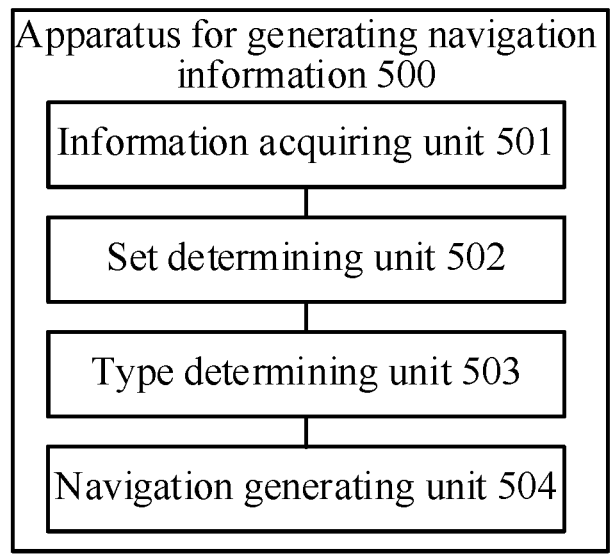
FIG. 5 is a schematic structural diagram of an apparatus for generating navigation information according to an embodiment of the present disclosure.

Further referring to FIG. 5, as an implementation of the method shown in the above figures, an embodiment of the present disclosure provides an apparatus for generating navigation information. The embodiment of the apparatus corresponds to the embodiment of the method shown in FIG. 2. The apparatus may be specifically applied to various electronic devices, such as a terminal device and a server.

As shown in FIG. 5, the apparatus 500 for generating navigation information of the present embodiment includes: an information acquiring unit 501, a set determining unit 502, a type determining unit 503, and a navigation generating unit 504.

The information acquiring unit 501 is configured to acquire intersection feature information.

The set determining unit 502 is configured to determine a set of a complex intersection based on the intersection feature information.

The type determining unit 503 is configured to determine intersection type information corresponding to the complex intersection in the set of the complex intersection.

The navigation generating unit 504 is configured to generate navigation information corresponding to the complex intersection in the set of the complex intersection based on the intersection type information.

In some alternative implementations of the present embodiment, the intersection feature information at least includes a road feature corresponding to an intersection and/or a yaw rate feature corresponding to the intersection; and the set determining unit 502 is further configured to: determine the set of the complex intersection based on the road feature corresponding to the intersection and/or the yaw rate feature corresponding to the intersection.

In some alternative implementations of the present embodiment, the road feature corresponding to the intersection at least includes the number of roads; and the set determining unit 502 is further configured to: determine, for each intersection, in response to determining that the number of roads corresponding to the intersection is greater than a preset number threshold and/or the yaw rate feature corresponding to the intersection indicates a yaw rate being greater than a preset yaw rate threshold, the intersection as a complex intersection; and determine the set of the complex intersection based on the complex intersection.

In some alternative implementations of the present embodiment, the type determining unit 503 is further configured to: determine, for each complex intersection in the set of the complex intersection, the intersection type information corresponding to the complex intersection based on road feature information corresponding to the complex intersection.

In some alternative implementations of the present embodiment, the navigation generating unit 504 is further configured to: determine, for each complex intersection in the set of the complex intersection, a navigation broadcasting voice corresponding to the complex intersection based on the intersection type information corresponding to the complex intersection; and generate the navigation information corresponding to the complex intersection based on the navigation broadcasting voice corresponding to the complex intersection.

In some alternative implementations of the present embodiment, the apparatus further includes: an information outputting unit configured to output, in response to determining that a vehicle travels to the complex intersection in the set of the complex intersection, the navigation information corresponding to the complex intersection.

It should be understood that the units 501 to 504 described in the apparatus 500 for generating navigation information correspond to the steps in the method described in FIG. 2 respectively. Therefore, the operations and features described above for the method for generating navigation information also apply to the apparatus 500 and the units included therein. The description will not be repeated here.

In the technical solutions of the present disclosure, the collection, storage, use, processing, transmission, provision, and disclosure of involved information, such as a road feature and a geographical location, are in conformity with relevant laws and regulations, and do not violate public order and good customs.

According to an embodiment of the present disclosure, the present disclosure further provides an electronic device, a readable storage medium, and a computer program product.

Figure 6:
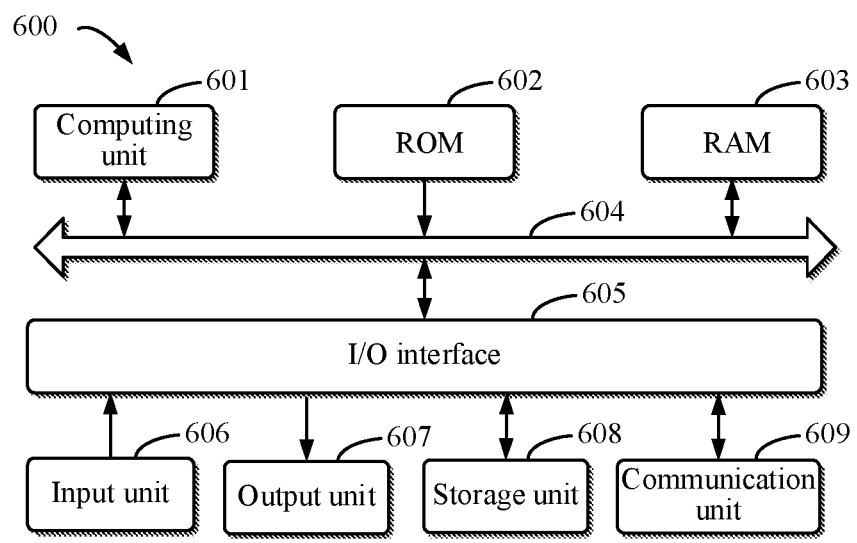
FIG. 6 is a block diagram of an electronic device configured to implement the method for generating navigation information of embodiments of the present disclosure.

FIG. 6 shows a schematic block diagram of an example electronic device 600 that may be configured to implement embodiments of the present disclosure. The electronic device is intended to represent various forms of digital computers, such as a laptop computer, a desktop computer, a workbench, a personal digital assistant, a server, a blade server, a mainframe computer, and other suitable computers. The electronic device may alternatively represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 6, the device 600 includes a computing unit 601, which may execute various appropriate actions and processes in accordance with a computer program stored in a read-only memory (ROM) 602 or a computer program loaded into a random access memory (RAM) 603 from a storage unit 608. The RAM 603 may further store various programs and data required by operations of the device 600. The computing unit 601, the ROM 602, and the RAM 603 are connected to each other through a bus 604. An input/output (I/O) interface 605 is also connected to the bus 604.

A plurality of components in the device 600 is connected to the I/O interface 605, including: an input unit 606, such as a keyboard and a mouse; an output unit 607, such as various types of displays and speakers; a storage unit 608, such as a magnetic disk and an optical disk; and a communication unit 609, such as a network card, a modem, and a wireless communication transceiver. The communication unit 609 allows the device 600 to exchange information/data with other devices through a computer network such as the Internet and/or various telecommunication networks.

The computing unit 601 may be various general purpose and/or specific purpose processing components having a processing capability and a computing capability. Some examples of the computing unit 601 include, but are not limited to, a central processing unit (CPU), a graphics processing unit (GPU), various specific purpose artificial intelligence (AI) computing chips, various computing units running a machine learning model algorithm, a digital signal processor (DSP), and any appropriate processor, controller, micro-controller, and the like. The computing unit 601 executes various methods and processes described above, such as the method for generating navigation information. For example, in some embodiments, the method for generating navigation information may be implemented as a computer software program that is tangibly included in a machine readable medium, such as the storage unit 608. In some embodiments, some or all of the computer programs may be loaded and/or installed onto the device 600 via the ROM 602 and/or the communication unit 609. When the computer program is loaded into the RAM 603 and executed by the computing unit 601, one or more steps of the method for generating navigation information described above may be executed. Alternatively, in other embodiments, the computing unit 601 may be configured to execute the method for generating navigation information by any other appropriate approach (e.g., by means of firmware).

Various implementations of the systems and technologies described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input apparatus and at least one output apparatus, and send the data and instructions to the storage system, the at least one input apparatus and the at least one output apparatus.

Program codes for implementing the method of the present disclosure may be compiled using any combination of one or more programming languages. The program codes may be provided to a processor or controller of a general purpose computer, a specific purpose computer, or other programmable apparatuses for data processing, such that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or server.

In the context of some embodiments of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, or a server of a distributed system, or a server combined with a blockchain.

It should be understood that the various forms of processes shown above may be used to reorder, add, or delete steps. For example, the steps disclosed in some embodiments of the present disclosure may be executed in parallel, sequentially, or in different orders, as long as the desired results of the technical solutions mentioned in some embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the spirit and principle of the present disclosure should be encompassed within the scope of protection of the present disclosure.

What is claimed is:

1. A method for generating navigation information, comprising:
    acquiring intersection feature information;
    determining a set of a complex intersection based on the intersection feature information;
    determining intersection type information corresponding to the complex intersection in the set of the complex intersection, wherein the intersection type information comprises a first type, the complex intersection comprises a first intersection of the first type, and the first intersection of the first type comprises a first visible road, a second road, and a third road intersected with the first visible road and the second road, an entrance of the second road being blocked by the first road in a driving direction of the third road;
    generating navigation information corresponding to the complex intersection in the set of the complex intersection based on the intersection type information and a pre-stored corresponding relationship between intersection types and pieces of navigation information, wherein the navigation information comprises a voice instruction of going through an intersection of the first visible road and the third road and turning to a direction of the second road; and
    broadcasting, based on the navigation information, the voice instruction of going through the intersection of the first road and the third road and turning to the direction of the second road, to guide a vehicle approaching the first intersection in the driving direction to travel to the second road,
    wherein the method further comprises: iteratively performing steps i and ii until a yaw rate of a target intersection where the vehicle is navigated by the navigation information is smaller than or equal to a preset yaw rate threshold, wherein the yaw rate is a proportion of yawed vehicles traveling through the target intersection within a specified time interval,
    step i comprising: determining that the yaw rate of the target intersection where the vehicle is navigated by the navigation information is greater than the preset yaw rate threshold; and
    step ii comprising: generating new navigation information as the navigation information, in response to determining that the yaw rate of the target intersection where the vehicle is navigated by the navigation information is greater than the preset yaw rate threshold.

2. The method according to claim 1, wherein the intersection feature information at least comprises a road feature corresponding to an intersection and/or a yaw rate feature corresponding to the intersection; and
    the determining the set of the complex intersection based on the intersection feature information comprises:
        determining the set of the complex intersection based on the road feature corresponding to the intersection and/or the yaw rate feature corresponding to the intersection.

3. The method according to claim 2, wherein the road feature corresponding to the intersection at least comprises a number of roads; and
    the determining the set of the complex intersection based on the road feature corresponding to the intersection and/or the yaw rate feature corresponding to the intersection comprises:
        determining, for each intersection, in response to determining that the number of roads corresponding to the intersection is greater than a preset number threshold and/or the yaw rate feature corresponding to the intersection indicates a yaw rate being greater than the preset yaw rate threshold, the intersection as a complex intersection; and
        determining the set of the complex intersection based on the complex intersection.

4. The method according to claim 1, wherein the determining the intersection type information corresponding to the complex intersection in the set of the complex intersection comprises:
    determining, for each complex intersection in the set of the complex intersection, the intersection type information corresponding to the complex intersection based on road feature information corresponding to the complex intersection.

5. An electronic device, comprising:
    at least one processor, and
    a memory communicatively connected to the at least one processor;
    wherein memory stores instructions executable by the at least one processor, and the instructions, when executed by the at least one processor, cause the at least one processor to perform operations comprising:
        acquiring intersection feature information;
        determining a set of a complex intersection based on the intersection feature information;
        determining intersection type information corresponding to the complex intersection in the set of the complex intersection, wherein the intersection type information comprises a first type, the complex intersection comprises a first intersection of the first type, and the first intersection of the first type comprises a first visible road, a second road, and a third road intersected with the first visible road and the second-road, an entrance of the second road being blocked by the first road in a driving direction of the third road;
        generating navigation information corresponding to the complex intersection in the set of the complex intersection based on the intersection type information and a pre-stored corresponding relationship between intersection types and pieces of navigation information, wherein the navigation information comprises a voice instruction of going through an intersection of the first visible road and the third road and turning to a direction of the second road; and broadcasting, based on the navigation information, the voice instruction of going through the intersection of the first road and the third road and turning to the direction of the second road, to guide a vehicle approaching the first intersection in the driving direction to travel to the second road, wherein the method further comprises: iteratively performing steps i and ii until a yaw rate of a target intersection where the vehicle is navigated by the navigation information is smaller than or equal to a preset yaw rate threshold, wherein the yaw rate is a proportion of yawed vehicles traveling through the target intersection within a specified time interval, step i comprising: determining that the yaw rate of the target intersection where the vehicle is navigated by the navigation information is greater than the preset yaw rate threshold; and step ii comprising: generating new navigation information as the navigation information, in response to determining that the yaw rate of the target intersection where the vehicle is navigated by the navigation information is greater than the preset yaw rate threshold.

6. The electronic device according to claim 5, wherein the intersection feature information at least comprises a road feature corresponding to an intersection and/or a yaw rate feature corresponding to the intersection; and the determining the set of the complex intersection based on the intersection feature information comprises:
determining the set of the complex intersection based on the road feature corresponding to the intersection and/or the yaw rate feature corresponding to the intersection.

7. The electronic device according to claim 6, wherein the road feature corresponding to the intersection at least comprises a number of roads; and the determining the set of the complex intersection based on the road feature corresponding to the intersection and/or the yaw rate feature corresponding to the intersection comprises:
determining, for each intersection, in response to determining that the number of roads corresponding to the intersection is greater than a preset number threshold and/or the yaw rate feature corresponding to the intersection indicates a yaw rate being greater than the preset yaw rate threshold, the intersection as a complex intersection; and
determining the set of the complex intersection based on the complex intersection.

8. The electronic device according to claim 5, wherein the determining the intersection type information corresponding to the complex intersection in the set of the complex intersection comprises:
determining, for each complex intersection in the set of the complex intersection, the intersection type information corresponding to the complex intersection based on road feature information corresponding to the complex intersection.

9. A non-transitory computer readable storage medium storing computer instructions, wherein the computer instructions cause a computer to perform operations comprising:
acquiring intersection feature information;
determining a set of a complex intersection based on the intersection feature information;

determining intersection type information corresponding to the complex intersection in the set of the complex intersection, wherein the intersection type information comprises a first type, the complex intersection comprises a first intersection of the first type, and the first intersection of the first type comprises a first visible road, a second road, and a third road intersected with the first visible road and the second road, an entrance of the second road being blocked by the first road in a driving direction of the third road;

generating navigation information corresponding to the complex intersection in the set of the complex intersection based on the intersection type information and a pre-stored corresponding relationship between intersection types and pieces of navigation information, wherein the navigation information comprises a voice instruction of going through an intersection of the first visible road and the third road and turning to a direction of the second road; and broadcasting, based on the navigation information, the voice instruction of going through the intersection of the first road and the third road and turning to the direction of the second road, to guide a vehicle approaching the first intersection in the driving direction to travel to the second road, wherein the method further comprises: iteratively performing steps i and ii until a yaw rate of a target intersection where the vehicle is navigated by the navigation information is smaller than or equal to a preset yaw rate threshold, wherein the yaw rate is a proportion of yawed vehicles traveling through the target intersection within a specified time interval, step i comprising: determining that the yaw rate of the target intersection where the vehicle is navigated by the navigation information is greater than the preset yaw rate threshold; and step ii comprising: generating new navigation information as the navigation information, in response to determining that the yaw rate of the target intersection where the vehicle is navigated by the navigation information is greater than the preset yaw rate threshold.

10. The storage medium according to claim 9, wherein the intersection feature information at least comprises a road feature corresponding to an intersection and/or a yaw rate feature corresponding to the intersection; and the determining the set of the complex intersection based on the intersection feature information comprises:
determining the set of the complex intersection based on the road feature corresponding to the intersection and/or the yaw rate feature corresponding to the intersection.

11. The storage medium according to claim 10, wherein the road feature corresponding to the intersection at least comprises a number of roads; and the determining the set of the complex intersection based on the road feature corresponding to the intersection and/or the yaw rate feature corresponding to the intersection comprises:
determining, for each intersection, in response to determining that the number of roads corresponding to the intersection is greater than a preset number threshold and/or the yaw rate feature corresponding to the intersection indicates a yaw rate being greater than the preset yaw rate threshold, the intersection as a complex intersection; and
determining the set of the complex intersection based on the complex intersection.

12. The storage medium according to claim 9, wherein the determining the intersection type information corresponding to the complex intersection in the set of the complex intersection comprises:

determining, for each complex intersection in the set of the complex intersection, the intersection type information corresponding to the complex intersection based on road feature information corresponding to the complex intersection.

* * * * *